US 6,229,707 B1

(12) United States Patent
Keenan et al.

(10) Patent No.: US 6,229,707 B1
(45) Date of Patent: May 8, 2001

(54) CALAMITY-PROOF ELECTRICAL EQUIPMENT CABINET DOOR SYSTEMS

(75) Inventors: James J. Keenan, Santa Barbara; Richard W. Sevier, Goleta, both of CA (US)

(73) Assignee: Hendry Mechanical Works, Goleta, CA (US)

( * ) Notice: Subject to any disclaimer, the term of this patent is extended or adjusted under 35 U.S.C. 154(b) by 0 days.

(21) Appl. No.: 09/352,735

(22) Filed: Jul. 14, 1999

(51) Int. Cl.$^7$ ................................ H05K 5/00; H02B 1/00
(52) U.S. Cl. .................. 361/724; 361/601; 361/616; 361/641; 361/659; 361/667; 361/672
(58) Field of Search ........................ 361/601, 605, 361/616, 622, 627, 628, 629–639, 641, 658, 659, 667, 672, 679, 724, 730; 312/298, 223.6; 379/327–330

(56) References Cited

U.S. PATENT DOCUMENTS

| 871,044 | 11/1907 | Pearson . | |
|---|---|---|---|
| 1,898,634 | 2/1933 | Lewis . | |
| 2,568,009 | 9/1951 | Johnson | 20/40 |
| 3,404,931 | 10/1968 | Fall et al. | 312/257 |
| 3,563,627 | 2/1971 | Whipps | 312/257 |
| 3,796,822 | 3/1974 | Eickman | 174/48 |
| 4,320,933 * | 3/1982 | Felix et al. | 312/223 |
| 4,509,647 | 4/1985 | Shevchuk | 211/41 |
| 4,600,254 | 7/1986 | Whalen | 312/323 |
| 4,664,265 | 5/1987 | George, Jr. | 211/41 |
| 4,901,202 * | 2/1990 | Leschinger | 361/390 |
| 5,001,602 * | 3/1991 | Suffi et al. | 361/390 |
| 5,121,824 * | 6/1992 | Halsey et al. | 194/350 |
| 5,148,348 | 9/1992 | White | 361/356 |
| 5,169,204 * | 12/1992 | Kelman | 296/146 D |
| 5,281,018 * | 1/1994 | Cullinan | 312/223.2 |
| 5,301,831 | 4/1994 | Holmes | 221/28 |
| 5,345,730 | 9/1994 | Jurgensen | 52/64 |
| 5,378,058 | 1/1995 | Tessmer | 312/298 |
| 5,380,083 | 1/1995 | Jones et al. | 312/265.3 |
| 5,476,316 * | 12/1995 | Batroney et al. | 312/287 |
| 5,519,756 * | 5/1996 | Clift | 379/44 |
| 5,542,549 | 8/1996 | Siemon et al. | 211/26 |
| 5,666,268 * | 9/1997 | Rix et al. | 361/692 |
| 5,764,729 * | 6/1998 | Black et al. | 379/44 |
| 5,777,845 * | 7/1998 | Krum et al. | 361/685 |
| 5,783,775 * | 7/1998 | Marusinec | 174/50 |
| 5,978,472 * | 11/1999 | Tuvy et al. | 379/399 |

FOREIGN PATENT DOCUMENTS

| 2655185 * | 5/1991 | (FR) | H01H/27/00 |
|---|---|---|---|
| 2700644 * | 7/1994 | (FR) | 174/52.1 |

* cited by examiner

Primary Examiner—Leo P. Picard
Assistant Examiner—Anatoly Vortman
(74) Attorney, Agent, or Firm—Koppel & Jacobs

(57) ABSTRACT

Electrical equipment is housed in a cabinet and is protected against hurricane-force calamities by covering the electrical equipment with an inner door system inside the cabinet, and by closing an opening of the cabinet with an environmental door system, and overlaying that environmental door system with a calamity-proof door system that may be used as an on-site temporary roof for installation and service personnel in an upturned position, and that constitutes a protection against hurricane-force calamities in a closed position on the shut environmental door system.

46 Claims, 4 Drawing Sheets

CALAMITY-PROOF ELECTRICAL EQUIPMENT CABINET DOOR SYSTEMS

FIELD OF THE INVENTION

The invention resides in methods and apparatus for housing electrical equipment and, more specifically, in calamity-proof door systems for electrical equipment cabinets.

BACKGROUND

Cabinets for electrical equipment are well known as such. In this respect, "electrical equipment" is to be understood in a broad sense, covering such apparatus as telephone substations and other telephone-related or telecommunication equipment, electrical power distribution substations or switching, transforming or distributing equipment, electrical storage battery or other emergency back-up systems, automated teller machines (ATMs) and other electronic equipment housed in cabinets that may, for instance, be free-standing outdoors.

In practice, such cabinets are made of heavy-gauge steel or similarly strong materials that successfully resist hurricane-force calamities as far as top, side and rear walls are concerned. However, doors have continued to be a problem even with strong outdoor cabinets.

This is particularly serious in the case of such apparatus as telephone substations and other telephone-related apparatus or telecommunication equipment, electrical power distribution substations or switching, transforming or distributing equipment, electrical storage battery or other emergency back-up systems, which serve large areas and need to be relied on especially in emergency situations. In a similar vein, automated teller machines (ATMs) and other electronic equipment are inherently vulnerable and can damage assets of a large number of people when invaded or abused.

The state of the art of outdoor cabinets for electrical equipment is exemplified by what has been disclosed in U.S. Pat. No. 5,378,058, entitled "Service Pedestal," by Wallace D. Tessmer, issued Jan. 3, 1995.

In particular, that prior patent in FIGS. 1, 2, 13, 17 and 19, for instance, discloses a cabinet door system comprising a hinged inner door 101 on an interior cabinet space containing circuit breakers, and a hinged exterior door 94. The inner door has a generally rectangular cutout 103 to provide egress for the circuit breakers with exposure of their actuating levers.

The exterior door 94 of that prior patent is solid and has a gasket 96 around its edges which serves to keep moisture out.

Exterior doors of such kind of free-standing or outdoor cabinets are particularly hard hit by larger objects having become airborne in hurricane-force calamities. In this respect, "hurricane-force wind" is a well known term of art referring to a wind, not necessarily a hurricane, having a very high speed, typically above 70 miles per hour or 30 meters per second. Accordingly, a hurricane-force calamity is intended to cover hurricanes, tornadoes, cyclones, typhoons and the like, and is intended to extend to forces of similar magnitude exerted accidentally or intentionally by vehicles or vandals or otherwise by mischievous humans or animals of all kinds.

SUMMARY OF THE INVENTION

It is a general object of the invention to overcome these problems by shutting openings of electrical equipment cabinets against hurricane-force calamities.

The invention resides in a method of housing electrical equipment in a cabinet having an opening and, more specifically, resides in the improvement of protecting the electrical equipment against hurricane-force calamities, comprising, in combination, covering the electrical equipment with an inner door system inside the cabinet, covering that inner door system and closing the opening of the cabinet with an environmental door system, and overlaying that environmental door system with a calamity-proof door system.

The invention resides also in an electrical equipment cabinet having an opening, and a closure system protecting electrical equipment in that cabinet against hurricane-force calamities, comprising, in combination, an inner door system covering the electrical equipment inside the cabinet, an environmental door system covering that inner door system and shutting the opening of the cabinet, and a calamity-proof door system overlaying the environmental door system when shut.

The invention resides also in a method of housing electrical equipment in a cabinet having an opening, and, more specifically, resides in the improvement of protecting the electrical equipment against hurricane-force calamities, comprising, in combination, covering such electrical equipment with an inner door system inside that cabinet, closing the opening of that cabinet with an environmental door system, and overlaying that environmental door system with a calamity-proof door system, with one of such environmental door system and calamity-proof door system being hinged in line with the earth's gravitational pull, and the other of such environmental door system and calamity-proof door system being hinged transversely to the earth's gravitational pull.

The invention resides also in a method of housing electrical equipment in a cabinet having an opening, and, more specifically, resides in the improvement of protecting the electrical equipment against hurricane-force calamities, comprising, in combination, covering such electrical equipment with an inner door system inside that cabinet, closing the opening of that cabinet with an environmental door system, overlaying that environmental door system with a calamity-proof door system, and using that calamity-proof door system as an on-site temporary roof for installation and service personnel in an upturned position.

The invention resides also in an electrical equipment cabinet having an opening and a closure system protecting electrical equipment in that cabinet against hurricane-force calamities, comprising, in combination, an inner door system covering the electrical equipment inside that cabinet, an environmental door system shutting that opening, and a calamity-proof door system overlaying that environmental door system when shut, with one of such environmental door system and calamity-proof door system hinged in line with the earth's gravitational pull, and the other of such environmental door system and calamity-proof door system hinged transversely to the earth's gravitational pull.

The invention resides also in an electrical equipment cabinet having an opening and a closure system protecting electrical equipment in that cabinet against hurricane-force calamities, comprising, in combination, an inner door system covering the electrical equipment inside that cabinet, an environmental door system shutting that opening, and a calamity-proof door system overlaying that environmental door system when shut and being an on-site temporary roof in an upturned position.

BRIEF DESCRIPTION OF THE DRAWINGS

The subject invention and its various aspects and objects will become more readily apparent from the following detailed description of preferred embodiments thereof, illustrated by way of example in the accompanying drawings which also constitute a written description of the invention, wherein like reference numerals designate like or equivalent parts, and in which.

DESCRIPTION OF THE PREFERRED EMBODIMENTS

The drawings show an electrical equipment cabinet 10 having heavy-gauge top, side and rear walls, such as visible at 12, 13, 14 and 15, and having an opening 16 shut against hurricane-force calamities. In this respect, the illustrated embodiment of the invention provides three different door systems 17, 18 and 19 for protecting electrical equipment 21.

Figure 1:
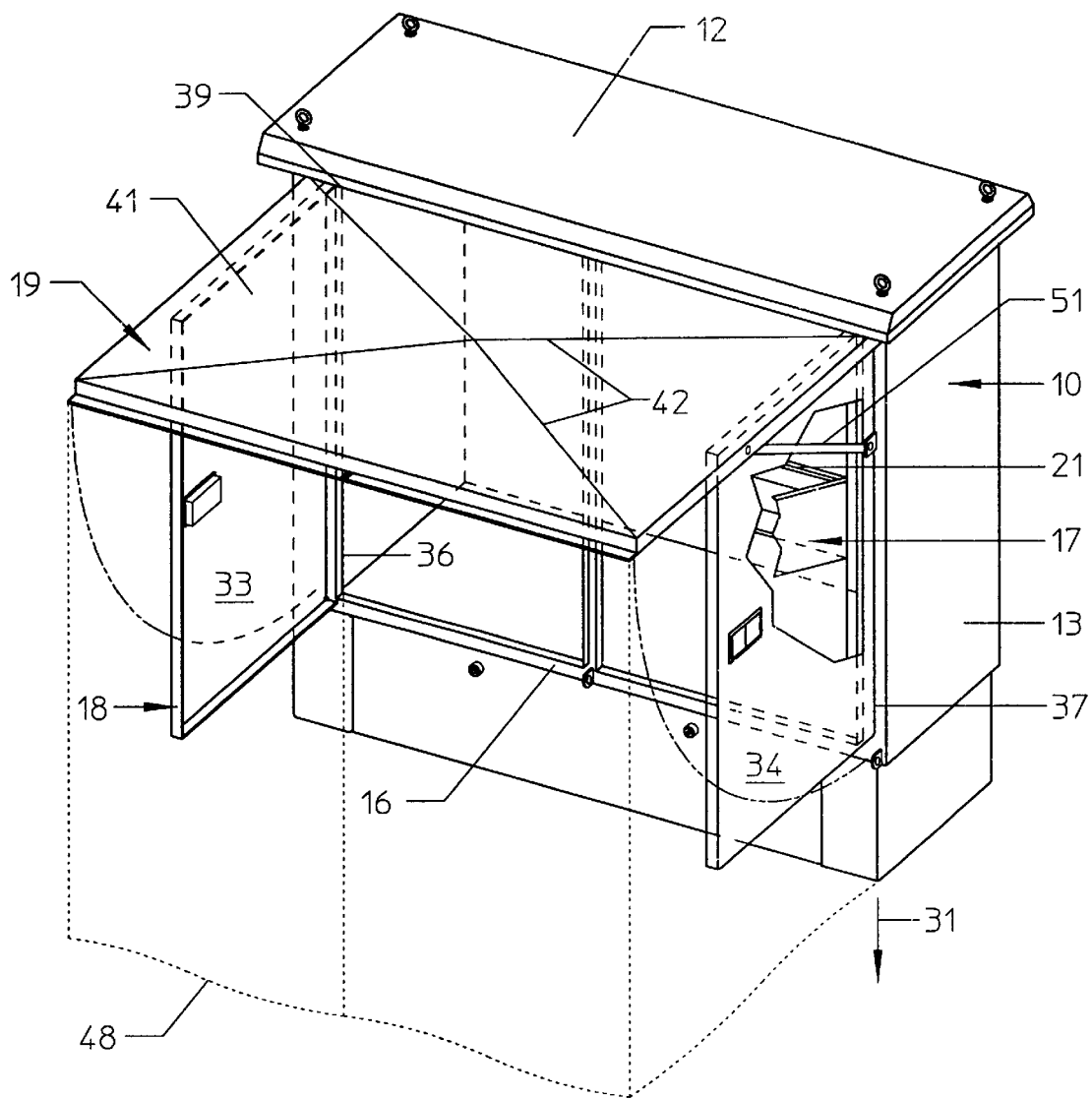
FIG. 1 is a perspective view of an electrical equipment cabinet with three different door systems for protecting electrical equipment in the cabinet against hurricane-force calamities according to an embodiment of the invention, with such three door systems shown open.
Figure 2:
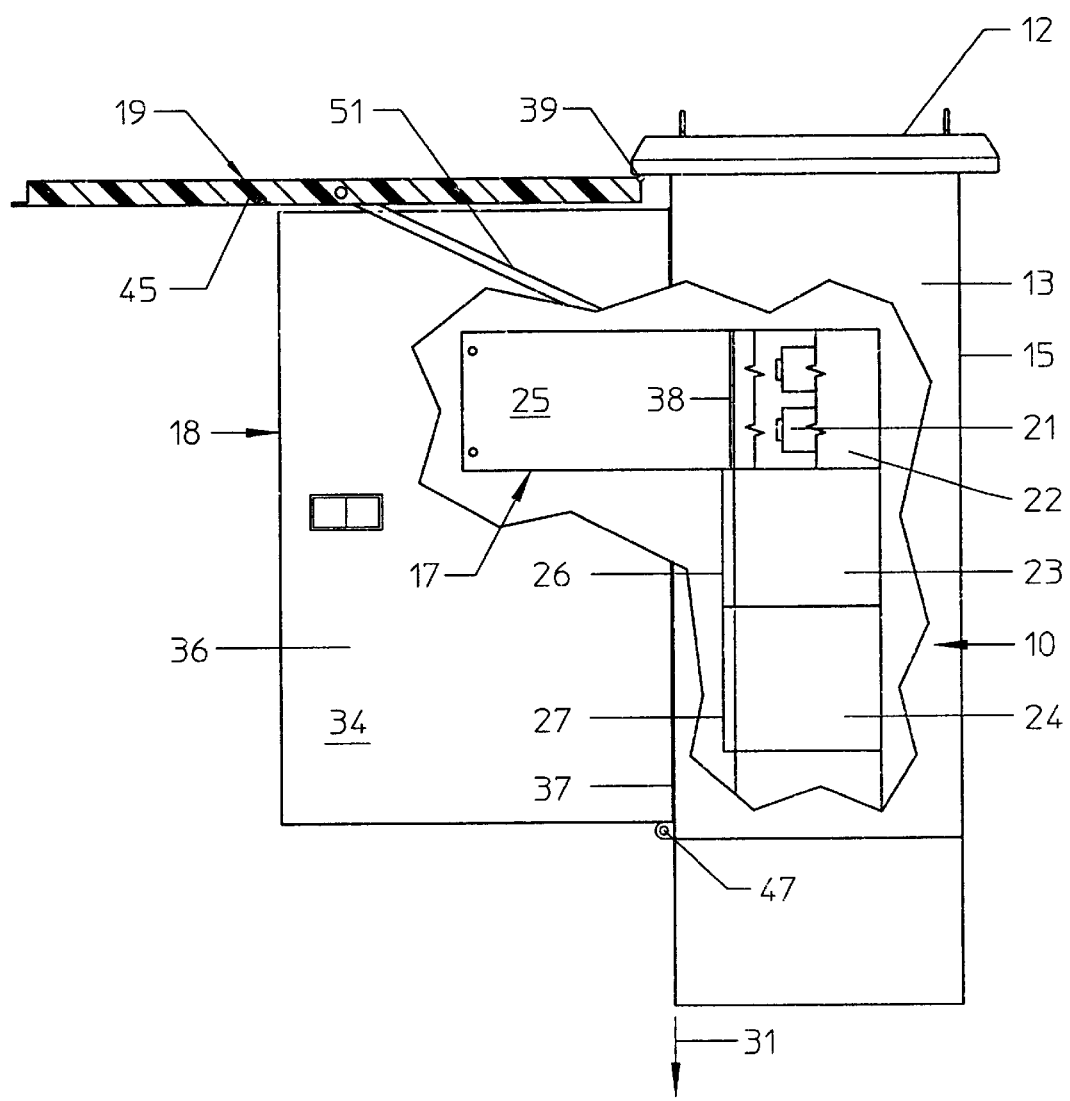
FIG. 2 is a partially sectioned side view of the cabinet system shown in FIG. 1, with all three door systems being opened.
Figure 3:
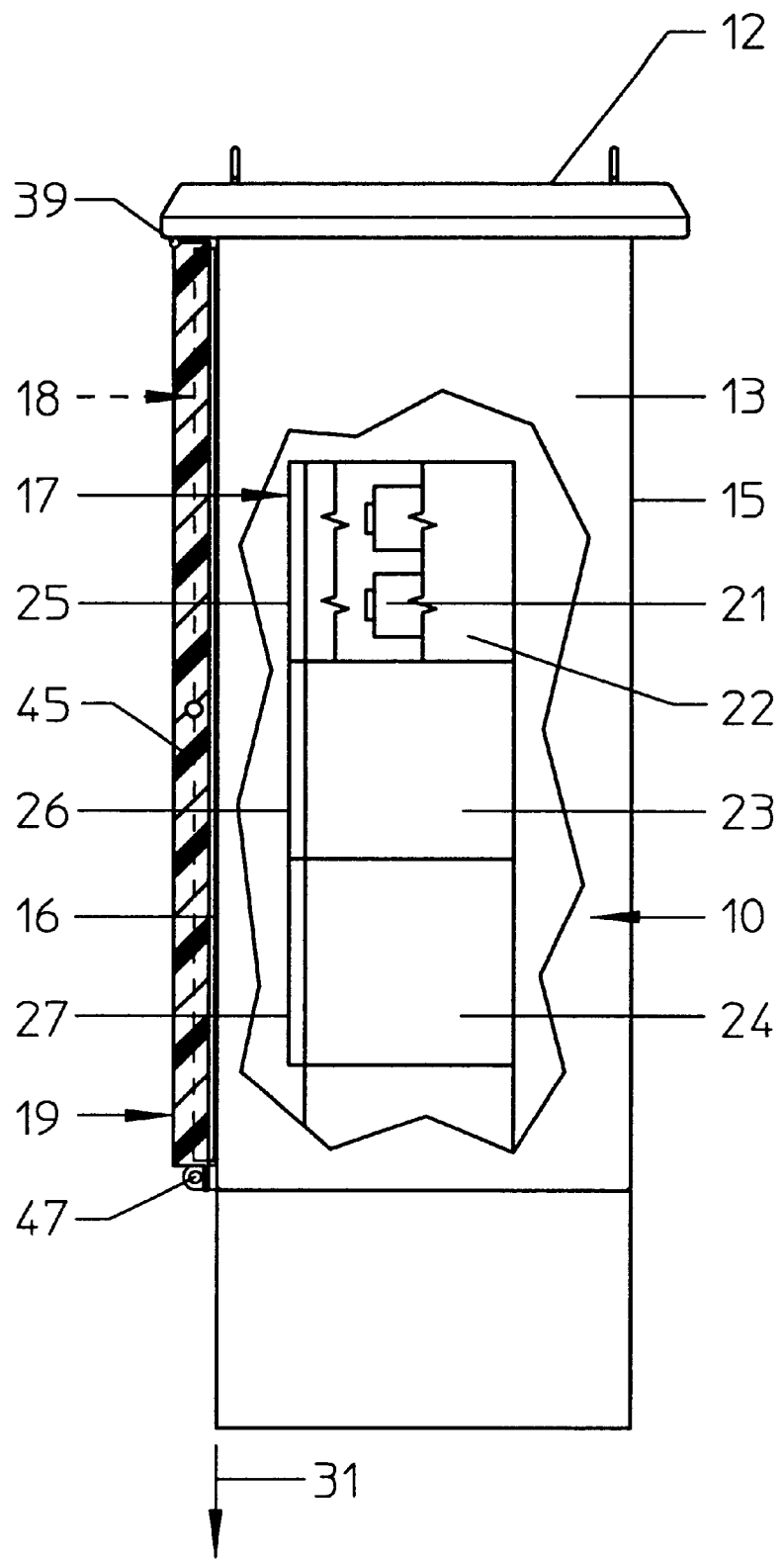
FIG. 3 is a partially sectioned side view similar to FIG. 2, but with all door systems shut.

In FIGS. 1, 2 and 3, electrical equipment 21 is seen through partially sectioned door and wall portions. FIG. 2 in particular shows electrical equipment racks 22, 23 and 24 inside the cabinet 10. These racks are individually equipped with electrical equipment rack doors 25, 26 and 27 jointly constituting the inner door system 17 covering electrical equipment 21, etc., inside the cabinet 10. Such electrical equipment 21, equipment racks 22, 23 and 24 and door system 17 or doors 25, 26 and 27 are inside of an opening of the cabinet and are accessible through such front opening 16 for installation, service or replacement when the outer door systems 18 and 19 are not shut; that is, are open, such as shown in FIGS. 1 and 2.

According to a further aspect of the invention, an opening, such as front opening 16 of the cabinet 10, is closed with an environmental door system 18 that covers the inner door system 17, and such environmental door system is overlaid with a calamity-proof door system 19.

An electrical equipment cabinet 10 according to the illustrated embodiment of the invention has an opening 16 and has a closure system protecting electrical equipment 21 in that cabinet against hurricane-force calamities. Such closure system comprises an inner door system 17 covering electrical equipment 21 inside the cabinet 10, an environmental door system 18 covering the inner door system 17 and shutting the cabinet 10 at opening 16, and a calamity-proof door system 19 overlaying the environmental door system 18 when shut.

In the illustrated embodiment of the invention, the door system 17 is an inner door system inside the cabinet 10, while the environmental door system 18 is an intermediate door system at or on the cabinet opening 16, and the calamity-proof door system 19 is an outer door system on the environmental or intermediate door system 18.

All three door systems pursuant to the invention are important. The intermediate door system 18 can be made smoother and more refined than the outer door system 19, for ideal sealing of the cabinet against the environment. This way no dust or other pollution can enter the inside of the cabinet, even if driven with hurricane-type force. This is also beneficial on the inner door system 17 which need not be sealed as tightly against hurricane-driven contamination, as would be the case if only the outer door system 19 and the inner door system 17 were present. In addition, the outer door system 19 can be designed more with a view to sturdiness and protection against storm-driven larger objects and other calamities, than with a view to tightness around the margins against dust and other pollution. By relegating the latter task to the intermediate door system 18, the exterior door system 19 can be designed as a truly calamity-proof door system. In this manner and as further disclosed below, the three door systems 17, 18 and 19 truly complement each other.

Further according to the illustrated embodiment of the invention, one of the environmental door system 18 and calamity-proof door system 19 is hinged in line with the earth's gravitational pull 31, while the other of such environmental door system 18 and calamity-proof door system 19 is hinged transversely to the earth's gravitational pull; that is, transversely to the hinging of the one of these environmental door system 18 and calamity-proof door system 19.

While the invention is not limited to any illustrated embodiment, it preferably is the intermediate or environmental door system 18 that is hinged in line with the earth's gravitational pull 31, such as for swinging sideways movement as seen in FIGS. 1 and 2. In that case, the outer or calamity-proof door system 19 preferably is hinged transversely to the earth's gravitational pull 31, such as for swinging up and down movement as seen in FIGS. 1 to 4 where such calamity-proof door system 19 overlays the intermediate or environmental door system 18 when shut.

At least the environmental door system 18 may be provided as or comprises a composite of doors jointly extending across the cabinet opening 16. In the illustrated embodiment of the invention, the environmental door system 18 is provided as or comprises a pair of doors 33 and 34 jointly extending across the cabinet opening 16. Each of these doors 33 and 34 preferably is hinged in line with the earth's gravitational pull 31, such as by vertical hinges at 36 and 37. Such doors and/or their doorjambs or doorframes may be provided with rubber or other sealing gaskets against intrusion of dust, moisture and the like, into the cabinet interior.

The inner door system 17 or any of the doors 25 to 27 could be hinged horizontally or vertically. In the illustrated embodiment, at least the door 25 of the inner electrical equipment door system 17 is also hinged in line with the earth's gravitational field 31, such as by a hinge 38. However, within the scope of the invention, the doors 25 to 27 or the door system 17 need not be hinged, but may be provided as cover panels attached, for instance, by releasable fasteners.

According to the illustrated embodiment of the invention, the outer or calamity-proof door system 19 is hinged, such as by a horizontal hinge 39, transversely to the earth's gravitational pull 31; that is, transversely to the illustrated hinging of the door systems 17 or 18 or doors 25, 33 and 34, for example.

Figure 4:
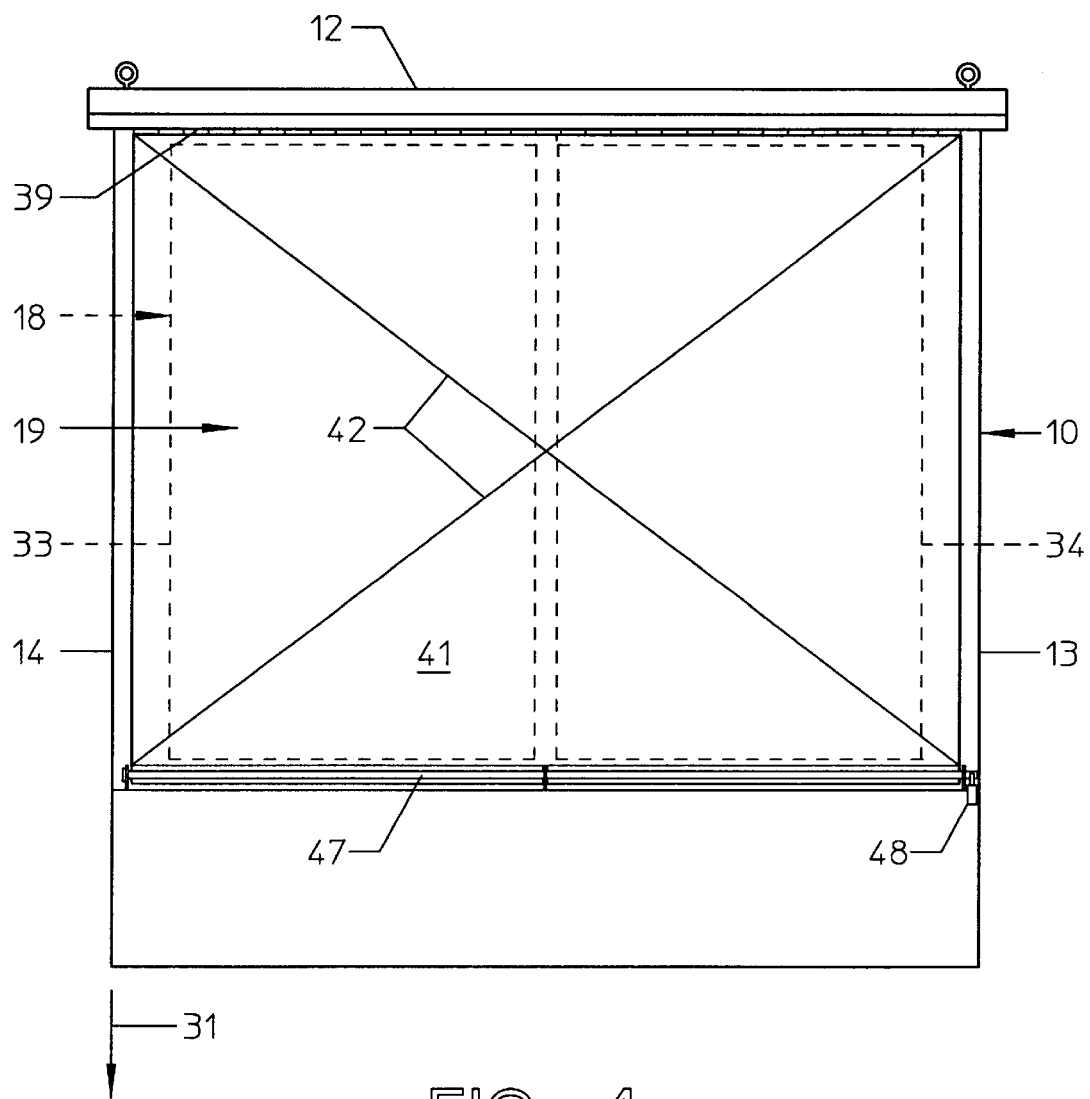
FIG. 4 is a frontal view of the cabinet shown in FIG. 3 with shut door systems.

The calamity-proof door system 19 preferably is one single door, for optimum resistance to large flying objects and other hurricane-force calamities. FIG. 4 shows the single door 41 for the calamity-proof door system 19 hinged for up and down movement at 39, according to the preferred embodiment of the invention.

FIGS. 2 and 3 show the door system 19 sectioned so as to display use of shock-absorbing or insulating material in that calamity-proof door system, according to a preferred embodiment of the invention. By way of example such door system 19 may be equipped with one or more panels of shock absorbing material 45 clad with the outer steel sections of that door system for optimum resistance against impact of various calamity-driven objects. Such reinforcing paneling may include thick foil-faced structural foam panels, such as expanded polystyrene or urethane panels, for insulation, including heat insulation, and for shock absorption. The environmental door system 18 or pair of doors 33 and 34 may also or alternatively be provided with such reinforcing paneling.

Alternatively or additionally, the calamity-proof door 41 may be reinforced by outward bending, such as indicated by crossed bending lines or creases 42 in FIGS. 1 and 4.

An optional locking bar 47 and padlock 48 or other locking system has been shown in FIG. 4 for locking the door systems or calamity-proof outer door 19 against unauthorized or unwanted access.

Such calamity-proof outer door 19 may be provided with one or more gas spring 51 or other releasable retention device for releasably retaining and stabilizing such outer door in an open position, such as shown in FIGS. 1 and 2.

The door system 19 according to an embodiment of the invention may not only be used as calamity-proof protection in its closed position, such as shown in FIGS. 3 and 4; but may also be used as an on-site temporary roof for installation and service personnel against sun and rain in its upturned position, such as shown in FIGS. 1 and 2. The insulating paneling 45 in such outer door may act as a sunshield for service personnel as well. Additionally, or alternatively, the outer door 19 may be equipped with a wet and cold weather protective curtain 48, such as used by service personnel.

In hot or rainy weather or in a storm, service personnel may install and suspend the protective curtain 48 from such upturned door system. The service personnel may then dry off any rain drops or other moisture from the environmental door system 18 before opening such intermediate door system. In fact, such intermediate door system provides an environmental protection for the delicate interior of the cabinet 10, quite in addition to the calamity-proof outer door system 19 and the inner door system 17.

Such inner door system 17 is also important in addition to both the calamity-proof outer door system 19 and the intermediate environmental door system 18. For one thing, such inner door system 17 acts as a barrier against direct contact with dangerous or delicate electrical or electronic equipment 21, even after the outer doors 18 and 19 have been opened. Also, if the inner door system 17 is sectioned, such as being provided with distinct doors 25, 26 and 27, for example, it is possible to make certain internal equipment accessible to certain personnel, such as through unlocked doors 25 and 26, while reserving sensitive other equipment for access by special personnel, such as through a specially locked door 27.

Moreover, this extensive disclosure will render apparent or suggest to those skilled in the art various modifications and variations within the spirit and scope of the invention.

We claim:

1. In a method of housing electrical equipment in a cabinet having an opening, the improvement of protecting the electrical equipment against hurricane-force calamities, comprising in combination:
   covering said electrical equipment with an inner door system inside said cabinet;
   covering said inner door system and closing said opening of said cabinet with an environmental door system; and
   overlaying said environmental door system with a calamity-proof door system.

2. A method as in claim 1, wherein:
   one of said environmental door system and said calamity-proof door system is hinged in line with the earth's gravitational pull; and
   the other of said environmental door system and said calamity-proof door system is hinged transversely to the earth's gravitational pull.

3. A method as in claim 1, wherein:
   said environmental door system is hinged in line with the earth's gravitational pull; and
   said calamity-proof door system is hinged transversely to the earth's gravitational pull.

4. A method as in claim 1, wherein:
   at least said environmental door system is provided as a composite of doors jointly extending across said opening.

5. A method as in claim 1, wherein:
   said calamity-proof door system is bent outwardly for reinforcement.

6. A method as in claim 1, wherein:
   said calamity-proof door system is provided with reinforcing paneling.

7. A method as in claim 1, wherein:
   said calamity-proof door system is provided with paneling of shock-absorbing material.

8. A method as in claim 1, wherein:
   said calamity-proof door system is provided with a releasable retention device for releasably retaining and stabilizing said calamity-proof door system in an open position.

9. A method as in claim 1, wherein:
   said calamity-proof door system is used as an on-site temporary roof for installation and service personnel in an upturned position.

10. A method as in claim 8, wherein:
    said calamity-proof door system is equipped with a protective curtain in said upturned position.

11. In an electrical equipment cabinet having an opening, a closure system protecting electrical equipment in said cabinet against hurricane-force calamities, comprising in combination:
    an inner door system covering said electrical equipment inside said cabinet;
    an environmental door system covering said inner door system and shutting said opening; and
    a calamity-proof door system overlaying said environmental door system when shut.

12. A cabinet as in claim 11, including:
    one of said environmental door system and said calamity-proof door system hinged in line with the earth's gravitational pull; and
    the other of said environmental door system and said calamity-proof door system hinged transversely to the earth's gravitational pull.

13. A cabinet as in claim 11, including:
    said environmental door system hinged in line with the earth's gravitational pull; and
    said calamity-proof door system hinged transversely to the earth's gravitational pull.

14. A cabinet as in claim 11, wherein:
at least said environmental door system includes a composite of doors jointly extending across said opening.
15. A cabinet as in claim 11, including:
said calamity-proof door system is bent outwardly for reinforcement.
16. A cabinet as in claim 11, wherein:
said calamity-proof door system has reinforcing paneling.
17. A cabinet as in claim 11, wherein:
said calamity-proof door system has paneling of shock-absorbing material.
18. A cabinet as in claim 11, including:
a releasable retention device coupled to said calamity-proof door system.
19. A cabinet as in claim 11, wherein:
said environmental door system comprises a pair of doors jointly extending across said opening, with each of said doors hinged in line with the earth's gravitational pull.
20. A cabinet as in claim 19, including:
said calamity-proof door system hinged transversely to the earth's gravitational pull.
21. A cabinet as in claim 11, wherein:
said calamity-proof door system is an on-site temporary roof in an upturned position.
22. A cabinet as in claim 21, wherein:
said calamity-proof door system has a protective curtain in said upturned position.
23. In a method of housing electrical equipment in a cabinet having an opening, the improvement of protecting the electrical equipment against hurricane-force calamities, comprising in combination:
covering said electrical equipment with an inner door system inside said cabinet;
closing said opening of said cabinet with an environmental door system; and
overlaying said environmental door system with a calamity-proof door system;
one of said environmental door system and said calamity-proof door system is hinged in line with the earth's gravitational pull; and
the other of said environmental door system and said calamity-proof door system is hinged transversely to the earth's gravitational pull.
24. A method as in claim 23, wherein:
said environmental door system is hinged in line with the earth's gravitational pull; and
said calamity-proof door system is hinged transversely to the earth's gravitational pull.
25. A method as in claim 23, wherein:
at least said environmental door system is provided as a composite of doors jointly extending across said opening.
26. A method as in claim 23, wherein:
said calamity-proof door system is bent outwardly for reinforcement.
27. A method as in claim 23, wherein:
said calamity-proof door system is provided with reinforcing paneling.
28. A method as in claim 23, wherein:
said calamity-proof door system is provided with paneling of shock-absorbing material.
29. A method as in claim 23, wherein:
said calamity-proof door system is provided with a releasable retention device for releasably retaining and stabilizing said calamity-proof door system in an open position.
30. A method as in claim 23, wherein:
said calamity-proof door system is used as an on-site temporary roof for installation and service personnel in an upturned position.
31. A method as in claim 30, wherein:
said calamity-proof door system is equipped with a protective curtain in said upturned position.
32. In a method of housing electrical equipment in a cabinet having an opening, the improvement of protecting the electrical equipment against hurricane-force calamities, comprising in combination:
covering said electrical equipment with an inner door system inside said cabinet;
closing said opening of said cabinet with an environmental door system;
overlaying said environmental door system with a calamity-proof door system; and
using said calamity-proof door system as an on-site temporary roof for installation and service personnel in an upturned position.
33. A method as in claim 32, wherein:
said calamity-proof door system is equipped with a protective curtain in said upturned position.
34. In an electrical equipment cabinet having an opening,
a closure system protecting electrical equipment in said cabinet against hurricane-force calamities,
comprising in combination:
an inner door system covering said electrical equipment inside said cabinet;
an environmental door system shutting said opening; and
a calamity-proof door system overlaying said environmental door system when shut;
one of said environmental door system and said calamity-proof door system hinged in line with the earth's gravitational pull; and
the other of said environmental door system and said calamity-proof door system hinged transversely to the earth's gravitational pull.
35. A cabinet as in claim 34, including:
said environmental door system hinged in line with the earth's gravitational pull; and
said calamity-proof door system hinged transversely to the earth's gravitational pull.
36. A cabinet as in claim 34, wherein:
at least said environmental door system includes a composite of doors jointly extending across said opening.
37. A cabinet as in claim 34, including:
said calamity-proof door system is bent outwardly for reinforcement.
38. A cabinet as in claim 34, wherein:
said calamity-proof door system has reinforcing paneling.
39. A cabinet as in claim 34, wherein:
said calamity-proof door system has paneling of shock-absorbing material.
40. A cabinet as in claim 34, including:
a releasable retention device coupled to said calamity-proof door system.
41. A cabinet as in claim 34, wherein:
said environmental door system comprises a pair of doors jointly extending across said opening, with each of said doors hinged in line with the earth's gravitational pull.
42. A cabinet as in claim 34, including:
said calamity-proof door system hinged transversely to the earth's gravitational pull.

43. A cabinet as in claim 34, wherein:

said calamity-proof door system is an on-site temporary roof in an upturned position.

44. A cabinet as in claim 43, wherein:

said calamity-proof door system has a protective curtain in said upturned position.

45. In an electrical equipment cabinet having an opening, a closure system protecting electrical equipment in said cabinet against hurricane-force calamities, comprising in combination:

an inner door system covering said electrical equipment inside said cabinet;

an environmental door system shutting said opening; and a calamity-proof door system overlaying said environmental door system when shut and being an on-site temporary roof in an upturned position.

46. A cabinet as in claim 45, wherein:

said calamity-proof door system has a protective curtain in said upturned position.

* * * * *